United States Patent
Igawa et al.

(10) Patent No.: US 10,497,913 B2
(45) Date of Patent: Dec. 3, 2019

(54) SEPARATOR FOR POWER STORAGE DEVICE AND POWER STORAGE DEVICE USING THE SEPARATOR

(71) Applicant: NIPPON KODOSHI CORPORATION, Kochi-shi (JP)

(72) Inventors: Atsushi Igawa, Kochi (JP); Norihiro Wada, Kochi (JP); Takumi Ichimura, Kochi (JP)

(73) Assignee: NIPPON KODOSHI CORPORATION, Kochi-shi (JP)

( * ) Notice: Subject to any disclaimer, the term of this patent is extended or adjusted under 35 U.S.C. 154(b) by 192 days.

(21) Appl. No.: 15/552,862

(22) PCT Filed: Jan. 14, 2016

(86) PCT No.: PCT/JP2016/050928
§ 371 (c)(1),
(2) Date: Aug. 23, 2017

(87) PCT Pub. No.: WO2016/143378
PCT Pub. Date: Sep. 15, 2016

(65) Prior Publication Data
US 2018/0047961 A1  Feb. 15, 2018

(30) Foreign Application Priority Data
Mar. 12, 2015 (JP) .................. 2015-049171

(51) Int. Cl.
*H01M 2/16* (2006.01)
*H01M 2/18* (2006.01)
(Continued)

(52) U.S. Cl.
CPC .............. *H01M 2/16* (2013.01); *H01G 9/02* (2013.01); *H01G 11/52* (2013.01); *H01M 2/18* (2013.01);
(Continued)

(58) Field of Classification Search
CPC ............. H01M 2/16; H01M 2/18; H01M 2/12
See application file for complete search history.

(56) References Cited

U.S. PATENT DOCUMENTS

| 6,042,769 A | 3/2000 | Gannon et al. |
| 6,074,523 A | 6/2000 | Mizobuchi et al. |

(Continued)

FOREIGN PATENT DOCUMENTS

| CN | 1676748 A | 10/2005 |
| CN | 104060491 A | 9/2014 |

(Continued)

OTHER PUBLICATIONS

International Search Report dated Mar. 15, 2016 in PCT/JP2016/050928 filed Jan. 14, 2016.

(Continued)

*Primary Examiner* — Kenneth J Douyette
(74) *Attorney, Agent, or Firm* — Oblon, McClelland, Maier & Neustadt, L.L.P.

(57) ABSTRACT

Provided is a separator for power storage device having excellent tearing strength, denseness, and resistance performance, and a power storage device provided with the separator for power storage device. The present invention constitutes a separator for power storage device including beatable regenerated cellulose fibers, wherein a CSF value X [ml] and a tear index Y [mN·m²/g] are within the ranges satisfying the following Formulae. The present invention also constitutes a power storage device in which the separator for power storage device is used, and which is formed by interposing the separator between one pair of electrodes.

$0 \leq X \leq 150$  Formula 1:

$10 \leq Y \leq 70$  Formula 2:

$Y \geq 0.3X - 5$  Formula 3:

14 Claims, 2 Drawing Sheets

(51) Int. Cl.
*H01G 11/52* (2013.01)
*H01G 9/02* (2006.01)
*H01M 10/0525* (2010.01)
*H01G 11/06* (2013.01)
*H01G 11/58* (2013.01)

(52) U.S. Cl.
CPC ........ *H01M 10/0525* (2013.01); *H01G 11/06* (2013.01); *H01G 11/58* (2013.01); *Y02E 60/13* (2013.01)

(56) References Cited

U.S. PATENT DOCUMENTS

| | | | |
|---|---|---|---|
| 6,413,674 B1 | 7/2002 | Mizobuchi et al. | |
| 2012/0003525 A1* | 1/2012 | Hashimoto | H01G 9/02 429/144 |
| 2013/0149614 A1* | 6/2013 | Kubo | H01M 2/1626 429/246 |
| 2013/0183569 A1 | 7/2013 | Hayakawa et al. | |
| 2015/0056515 A1* | 2/2015 | Kim | H01M 4/483 429/231.5 |
| 2015/0287536 A1 | 10/2015 | Tanaka et al. | |

FOREIGN PATENT DOCUMENTS

| | | |
|---|---|---|
| CN | 107210132 A | 9/2017 |
| EP | 3 246 927 A1 | 11/2017 |
| JP | 10-504858 A | 5/1998 |
| JP | 2000-3834 A | 1/2000 |
| JP | 2010-239094 A | 10/2010 |
| JP | 2012-221567 A | 11/2012 |
| JP | 2014-56953 A | 3/2014 |
| JP | 2014-123607 A | 7/2014 |
| JP | 2015-4140 A | 1/2015 |
| JP | 2015-88703 A | 5/2015 |

OTHER PUBLICATIONS

Combined Chinese Office Action and Search Report dated Aug. 28, 2018, in Patent Application No. 201680014327.1 (with partial English translation and English translation of categories of cited documents), 13 pages.

Extended European Search Report dated Oct. 22, 2018 in Patent Application No. 16761350.4.

\* cited by examiner

SEPARATOR FOR POWER STORAGE DEVICE AND POWER STORAGE DEVICE USING THE SEPARATOR

TECHNICAL FIELD

The present invention relates to a separator for power storage device and a power storage device using the separator. In addition, the present invention is suitable for a separator for power storage device and a power storage device such as an electric double-layer capacitor, a lithium-ion capacitor, and a lithium-ion secondary battery.

BACKGROUND ART

A power storage device such as an electric double-layer capacitor is a capacitor which utilizes the electric double-layer phenomenon in which, when contacting a polarizable electrodes with an electrolytic solution, counter electric charges are stored on the interface between the surface of the polarizable electrodes and the electrolytic solution, and is generally constituted by a pair of counter polarizable electrodes, a separator separating the pair of the polarizable electrodes electrically and physically, and an organic electrolytic solution. Active carbon powder or the like having a large charge storage interface, namely, a large specific area is used as the polarizable electrodes.

Since the electric double-layer capacitor has a large electrode area and can give a considerably large capacity in comparison with an aluminum electrolytic capacitor which is recognized as having a large capacity among capacitors, there has been used mainly for a memory back-up purpose of electric home appliances, and the like.

Recently, attention is paid to the electric double-layer capacitor having a large capacity and its use is spreading to various applications such as cars, solar power generation and wind power generation in addition to uses for OA devices and industrial machines.

From structural point of view, the electric double-layer capacitor has a coin type, a wound type and a lamination type, and the capacity of the electric double-layer capacitor is determined by a surface area of the electrode acting as a charge storage interface.

The coin-type electric double-layer capacitor has a pair of polarizable electrodes obtained by binding fine active carbon fibers or active carbon powders through the use of a binder to thereby form a mat-shaped material, and then punching the material into a circular shape. In addition, the coin-type electric double-layer capacitor was constituted, by impregnating a separator interposed in parallel between the pair of polarizable electrodes with an electrolytic solution, then storing the polarizable electrodes and the separator in a metal case doubling as an outer casing, and furthermore by sealing the case by swaging a metal lid via a gasket.

In order to enlarge a surface area of an electrode material, the wound-type electric double-layer capacitor has an electrode obtained by coating and binding a fine powdery active carbon onto a surface of a metal foil being a collector through the use of a binder. In addition, the one pair of the electrodes is wound by interposing a separator to form a capacitor element, and the wound-type electric double-layer capacitor is constituted, by storing the element in a metal case, then injecting an electrolytic solution thereinto, and by sealing the case.

In order to enlarge a surface area of an electrode material, the lamination-type electric double-layer capacitor has an electrode obtained by coating and binding a fine powdery active carbon onto a surface of a metal foil being a collector by the use of a binder. In addition, the active carbon electrode and a separator are alternately laminated to form a capacitor element, and the lamination-type electric double-layer capacitor is constituted, by storing the element in a metal case or a multilayered laminate film using a thick aluminum foil, then injecting an electrolytic solution thereinto, and by sealing the case.

There is adopted the wound-type structure or the lamination-type structure of the electric double-layer capacitor having a large capacity whose application is recently spreading. The large capacity type is used for regenerated energy of cars and the like or is used for systems of wind power generation and solar power generation, having large load fluctuation. These uses require properties such as excellent instantaneous charge-discharge, and long cycle life.

In order to enhance the charge-discharge property and achieve the long cycle life of the electric double-layer capacitor, it is essential to realize low resistance of the capacitor. When a large current is charged and discharged for a short time, in a case where an internal resistance value is large, loss due to the resistance is increased. Furthermore, the loss generates heat, and effects of the generated heat accelerates degradation of properties.

For the reduction in the resistance of the electric double-layer capacitor, aggressive improvements of various members such as an electrode material and an electrolytic solution have been carried out, and the reduction in the resistance of the separator is also strongly required.

Effective techniques for reducing the resistance of the separator are to reduce the basis weight of the separator, to reduce the density, and to make the thickness thin.

However, there are caused various problems in mere reduction of the basis weight of the separator, reduction of the density, and making the thickness thin.

The denseness of the separator is also reduced by reduction of the basis weight of the separator, reduction of the density, and making the thickness thin. Accordingly, in a case of the use of the separator as the electric double-layer capacitor, there is a problem that an element short circuit defect rate and an aging short circuit defect rate are increased, and even if short-circuiting does not occur, a leakage current value is increased.

In addition, the value of tearing strength of the separator is also lowered, in a case of reducing the basis weight of the separator, reducing the density, and making the thickness thin. As a result, during the manufacturing step of the electric double-layer capacitor, the separator is broken to lower productivity and yield.

For these reasons, even if the separator has a low basis weight, low density and is thin, the separator is required to have high denseness so as not to increase a short circuit defect rate and strength so as to avoid paper breaking in each step.

In order to enhance denseness of the separator and to reduce the short circuit defect rate of the electric double-layer capacitor, there have been known methods in which the thickness of the separator is made large, and a value of CSF (Canadian Standard Freeness) in accordance with JIS P 8121 which indicates a degree of beating of pulp being a raw material is made smaller, thereby enhancing the density.

However, when the thickness of the separator is made large and the density is increased, a resistance value is worsened.

As mentioned above, as to the separator for the electric double-layer capacitor, even though the separator has low resistance, there is required a thin separator capable enhancing yield while being capable of improving the short circuit defect rate and leakage current property.

In addition, also as to a lithium-ion capacitor and a lithium-ion secondary battery, there also is required a separator satisfying these requirements.

In the separator for power storage device, there have been proposed various configurations so far in order to enhance properties (for example, refer to Patent Literature 1 to Patent Literature 4).

CITATION LIST

Patent Literature

PTL 1: Japanese Patent Laid-Open No. 2000-003834
PTL 2: Japanese Patent Laid-Open No. 2012-221567
PTL 3: Japanese Patent Laid-Open No. 2014-056953
PTL 4: Japanese Patent Laid-Open No. 2014-123607

SUMMARY OF INVENTION

Technical Problem

In Patent Literature 1, there is proposed a separator having a low resistance value while maintaining high denseness. Patent Literature 1 discloses that a separator using the solvent-spun cellulose fiber having a high degree of beating has a quality of paper of high denseness and a finely porous shape, and in an electric double-layer capacitor fabricated by the use of the separator, respective properties of an internal resistance and a short circuit defect rate, and a leakage current value are enhanced.

However, as recently required, in realizing further thinning of and reduction in density of the separator in order to improve charge-discharge properties of the electric double-layer capacitor, in case of using the separator with a content of a 100% by mass of the beatable solvent-spun cellulose fiber as shown in Patent Literature 1, the tearing strength is low, and thus there has been a case where the separator is broken during the manufacturing step of the electric double-layer capacitor of each of a wound type and a lamination type.

The breakage of the separator is considered to be the following reason.

Fine fibrils each having a size of several tens nm to several μm are obtained by increase in the degree of beating of the beatable solvent-spun cellulose fiber. Since the obtained fibrillated fine fiber is highly rigid and is difficult to be collapsed, it is not bound in the form of a film just like the fibrillated fine fiber of natural fiber, when being made into a paper. Therefore, by using, for the separator, the fibrillated fine fiber obtained by beating the solvent-spun cellulose fiber, it is possible to obtain a separator having an extremely high denseness, in which fine fibers that are independent with each other are intermingled and constituted by numerous adhesion points (hydrogen bond). In spite of the fact that the obtained separator has high denseness, the paper quality of the separator is finely porous in terms of its structure, and a separator having a low resistance value is obtained. As a result, the electric double-layer capacitor fabricated by the use of the separator in which a beating raw material of the solvent-spun cellulose fiber is blended can improve the respective properties of the internal resistance, the short circuit defect rate, and the leakage current value.

However, although the beatable solvent-spun cellulose fiber is increased in the bonds between the fibers by beating to thereby enhance the tensile strength, the tearing strength becomes low drastically when further increasing the degree of beating of the fiber. Namely, the relation of the tensile strength due to the bond between the fibers and the tearing strength is reciprocity relation, and although the tensile strength is enhanced as the degree of beating becomes higher, the tearing strength is lowered.

Here, when inhibiting the beating in order to enhance the tearing strength, since not only the tensile strength but also the denseness is lowered, there are generated problems such as the increase in the short circuit defect rate and in the leakage current of the electric double-layer capacitor.

In Patent Literature 2, there is proposed a separator that is excellent in strength in adherence of an electrolytic solution by the use of the regenerated cellulose fiber in which freeness is controlled.

However, the separator described in Patent Literature 2 has a lower degree of beating than the separator described in Patent Literature 1. Accordingly, the separator is lack in denseness. As a result, the short circuit defect of the electric double-layer capacitor is increased and the leakage current is also increased.

In Patent Literature 3, there is proposed a separator obtained by mixing a regenerated cellulose fiber in which freeness is controlled and a regenerated cellulose short fiber which is not beaten.

However, the separator described in Patent Literature 3 has lower denseness than the separator described in Patent Literature 1. Accordingly, the denseness of the separator is insufficient in view of the recent requirement of lowering of the leakage current value and the short circuit defect rate. Furthermore, the separator is weaker in the tearing strength than the separator of Patent Literature 2, and thus there has been a case where the breakage of the separator is increased during the manufacturing step of the electric double-layer capacitor.

In Patent Literature 4, there is proposed a finely porous film separator including the regenerated cellulose.

However, the separator described in Patent Literature 4 is weak in the tearing strength, and thus there has been a case where the breakage of the separator is increased during the manufacturing step of the power storage device.

As mentioned above, since denseness, resistance performance and tearing strength and the like required for the separator have a complicatedly related and contrary relation, it is difficult to enhance all these properties at the same time.

The present invention has been made to solve the above problems, and an object of the present invention is to provide a separator for power storage device excellent in the tearing strength, denseness and resistance performance. In addition, an object of the present invention is to provide a power storage device capable of reducing an internal resistance value, a short circuit defect rate and a leakage current value, and also enhancing yield, by the use of the separator for power storage device.

Solution to Problem

The separator for power storage device of the present invention is a separator for power storage device which is interposed between a pair of electrodes and is capable of holding an electrolyte-containing electrolytic solution; at least one layer of the separator including beatable regenerated cellulose fibers, and a CSF value X [ml] and a tear index Y [mN·m$^2$/g] of the separator are within the ranges satisfying the following Formulae 1 to 3 at the same time.

$$0 \leq X \leq 150 \qquad \text{Formula 1:}$$

$$10 \leq Y \leq 70 \qquad \text{Formula 2:}$$

$$Y \geq 0.3X - 5 \qquad \text{Formula 3:}$$

In the separator for power storage device of the present invention, more preferably, the CSF value X and the tear index Y are within the ranges satisfying the following Formulae 1 to 4.

$$0 \leq X \leq 150 \quad \text{Formula 1:}$$

$$10 \leq Y \leq 70 \quad \text{Formula 2:}$$

$$Y \geq 0.3X-5 \quad \text{Formula 3:}$$

$$Y \leq 0.1X+40 \quad \text{Formula 4:}$$

In the separator for power storage device of the present invention, further preferably, the CSF value X and the tear index Y are within the ranges satisfying the following Formulae 2 to 5.

$$10 \leq Y \leq 70 \quad \text{Formula 2:}$$

$$Y \geq 0.3X-5 \quad \text{Formula 3:}$$

$$Y \leq 0.1X+40 \quad \text{Formula 4:}$$

$$0 \leq X \leq 50 \quad \text{Formula 5:}$$

In the separator for power storage device of the present invention, the thickness is more preferably 10 to 80 μm.

In the separator for power storage device of the present invention, the density is more preferably 0.25 to 0.70 g/cm³.

Note that, in the present invention, the "CSF value" is a value measured in accordance with "JIS P8121-2 Pulp—Determination of drainability—Part 2: Canadian Standard freeness method".

In addition, the "tear index" is a value obtained by dividing the tearing strength by the basis weight, and is a tear index in the cross direction (CD) defined in "JIS P 8116 "Paper-Determination of tearing resistance—Elmendorf tearing tester method"".

Furthermore, for example, when the aforementioned separator is constituted by a mixed raw material of regenerated cellulose fibers having two different degrees of beating of the fiber A and the fiber B, it becomes possible that the CSF value X and the tear index Y of the separator are within the range satisfying the following Formulae 1 to 3.

The power storage device of the present invention is constituted by interposing a separator between a pair of electrodes, and the separator of the present invention is used as the separator.

Furthermore, the power storage device is, for example, an electric double-layer capacitor, a lithium-ion capacitor, or a lithium-ion secondary battery.

Advantageous Effects of Invention

According to the present invention, it is possible to provide the separator for power storage device, which is excellent in the tearing strength, denseness and resistance performance.

Moreover, it is possible to provide the power storage device capable of reducing an internal resistance value, a short circuit defect rate and a leakage current value, and also enhancing yield at the time of production, by the use of the separator.

DESCRIPTION OF EMBODIMENTS

Figure 1:
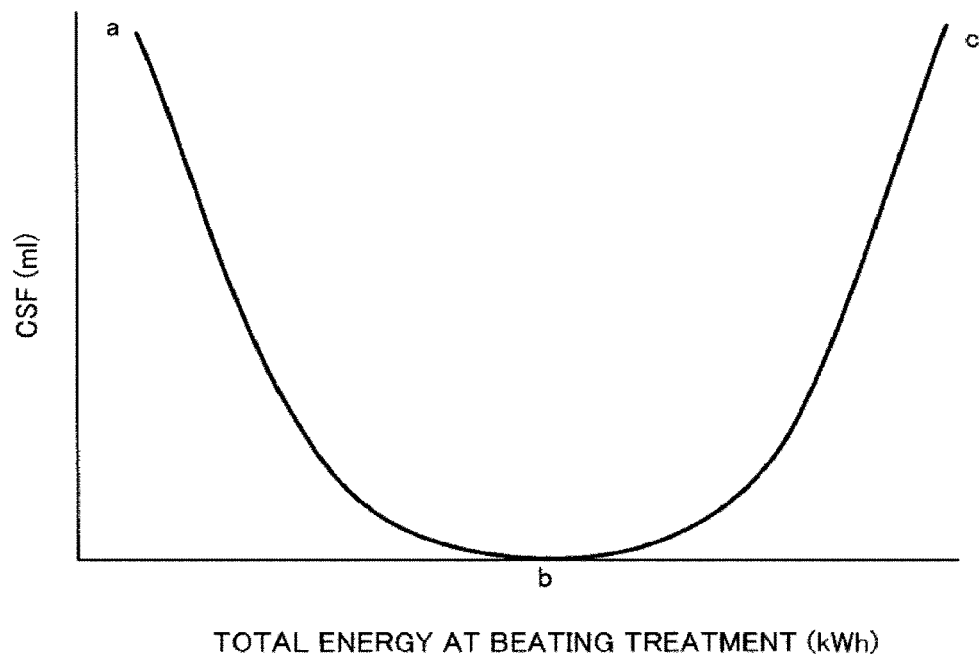
FIG. 1 is an explanatory view of the relation between the total energy at the beating treatment and the CSF value, in relation to the fiber constituting the separator for power storage device of the present invention.

Hereinafter, one embodiment of the present invention will be explained in detail by referring to drawings and the like.

The separator for power storage device of the present embodiment is a separator for power storage device interposed between a pair of electrodes: at least of one layer of the separator including beatable regenerated cellulose fibers, and a CSF value X [ml] and a tear index Y [mN·m²/g] of the separator are within the ranges satisfying the following Formulae 1 to 3 at the same time, more preferably within the ranges satisfying the following Formulae 1 to 4 at the same time, and more preferably within the ranges satisfying the following Formulae 2 to 5 at the same time.

$$0 \leq X \leq 150 \quad \text{Formula 1:}$$

$$10 \leq Y \leq 70 \quad \text{Formula 2:}$$

$$Y \geq 0.3X-5 \quad \text{Formula 3:}$$

$$Y \leq 0.1X+40 \quad \text{Formula 4:}$$

$$0 \leq X \leq 50 \quad \text{Formula 5:}$$

Furthermore, the power storage device of the present embodiment uses the separator for power storage device having the aforementioned configuration as a separator and has a configuration in which the separator is interposed between a pair of electrodes.

The power storage device may include the above configuration as at least one of the separator layers, and a multilayering means and a forming method of the layers may be any method usually selected.

The tearing strength is known to be proportional to the basis weight that is a mass per 1 m² of paper.

Accordingly, the tear index that is a value calculated by dividing the value of the tearing strength by the basis weight is used as an index which is for making a comparison between the tearing strengths and which is obtained by elimination of factors such as the basis weight of paper and the thickness.

The tearing strength is derived mainly from properties of a raw material. The tear index is excellent from the viewpoint that not only the comparison among the properties of the paper of the separator but also the comparison among the properties of the raw material can be made at the same time by comparison among the tear indexes.

The tear index varies largely depending on the degree of beating of the raw material. The tear index gradually increases along with the increase of the degree of beating, and furthermore, when the degree of beating further increases, the tear index becomes lowered.

Note that the equipment used for beating of a fiber may be any equipment to be generally used for preparation of papermaking raw material. Generally, examples thereof include a beater, a conical refiner, a disc refiner, a high-pressure homogenizer, and the like.

The fiber is beaten to be micronized.

When the micronized regenerated cellulose by beating is tried to be filtered on a sieve plate, it is influenced by a fiber mat initially accumulated on the sieve plate. After that, the resistance of a suspension trying to pass through the sieve plate becomes larger. Accordingly, when the regenerated cellulose is micronized more by beating, the CSF value gradually becomes low, and reaches the lower limit.

When the fiber is further beaten from a state in which the CSF value reaches the lower limit, the fine fibers which pass through the pore of the sieve plate are increased, and the CSF value then turns upward.

Here, the value of the lower limit of the freeness varies depending on fineness of the fiber subjected to beating and conditions of a beating treatment. Accordingly, there is a case where the freeness reaches the lower limit before the CSF value is decreased to 0 ml, or there is a case where, even after the CSF value reaches 0 ml, the CSF value is not increased instantly, but the CSF value becomes larger after exhibiting 0 ml for a while.

In FIG. 1, the aforementioned change of the state will be shown. FIG. 1 is an image view showing the relation between the total energy (kWh) of the beating treatment and the CSF value (ml), as to the fiber (regenerated cellulose fiber) constituting the separator for power storage device of the present invention.

As shown in FIG. 1, the CSF value gradually becomes small from a state a in which the CSF value is large by micronization of the regenerated cellulose through beating, and reaches once the lower limit (state b). Then, the fine fibers passing through the pore of the sieve plate are increased by further beating, and thus the CSF value turns upward. In addition, when the CSF value increases and becomes large, the value reaches a state c.

For example, when using a mixed raw material of fiber (regenerated cellulose fiber) having two different degrees of beating of the fiber A and the fiber B, the separator of the present embodiment can be obtained.

Note that, in the following, among the fiber A and the fiber B, the fiber A is assumed to be a fiber having a lower degree of beating, and the fiber B is assumed to be a fiber having a higher degree of beating.

There is adopted, as the fiber A, a fiber having a CSF value of 350 to 0 ml.

In addition, a blending ratio of the fiber A is 20 to 80% by mass.

There is adopted, as the fiber B, a fiber having a CSF value of 1 to 500 ml in which the CSF value is once lowered to the lower limit (0 ml or + value) and then turns upward by further beating.

In addition, a blending ratio of the fiber B is 20 to 80% by mass.

In the present embodiment, it is possible to provide the separator for power storage device which is excellent in tearing strength, denseness and resistance performance, by adopting the aforementioned configuration. By the use of the separator for power storage device as the power storage device, it becomes possible to decrease an internal resistance value, a short-circuit defect rate and a leakage current value, and further to enhance a yield in the production steps of the power storage device.

Furthermore, it is preferable to assume a capacitor and a battery as the power storage devices, and furthermore the capacitor can include an electric double-layer capacitor or a lithium-ion capacitor, and the battery can include a lithium-ion secondary battery. In the following explanation, there will be explained an example of using, as the power storage devices using the separator of the present embodiment, the capacitor and the battery, specifically, the electric double-layer capacitor, the lithium-ion capacitor, and the lithium-ion secondary battery. However, this does not eliminate the adoption of other power storage devices.

In addition, as a result of testing as to various materials, and constituent ratios, as mentioned above, an excellent result is obtained by blending, in an amount of 20 to 80% by mass, respectively, the regenerated cellulose fiber A that is beaten until the CSF value is 350 to 0 ml and the regenerated cellulose fiber B having a CSF value of 1 to 500 ml in which the CSF value is once lowered to the lower limit and then turns upward by further beating, and then by papermaking.

Namely, it becomes possible to achieve both properties of the tearing strength and the denseness which have a contrary relation, by mixing and papermaking, in the aforementioned amount, the fiber A and the fiber B which are the regenerated cellulose fibers having two different degrees of beating.

An electric double-layer capacitor using the separator for power storage device of the present embodiment can be constituted by impregnating the separator part with an organic electrolytic solution and holding the electrolytic solution there, and by separating a pair of polarizable electrodes through the use of the separator.

The organic electrolytic solution is a solution in which a salt having cation species such as tetraethylammonium and triethylmethylammonium and having anion species such as tetrafluoroborate or hexafluorophosphate is dissolved in an organic solvent such as propylene carbonate or acetonitrile. However, the electrolytic solution is not limited to the above examples and the combinations, and any ordinary electrolytic solution may be used.

A lithium-ion capacitor using the separator for power storage device of the present embodiment can be constituted by impregnating the separator part with an organic electrolytic solution and holding the electrolytic solution there, and by separating the both electrodes through the use of the separator.

There is usually used, as a positive electrode material, an electrode in which a finely divided active carbon is coated and bound onto a surface of a metal foil being a collector through the use of a binder, in a similar way to the electric double-layer capacitor.

There is usually used, as a negative electrode material, an electrode in which black lead or graphite is coated and bound onto a surface of a metal foil being a collector through the use of a binder.

The organic electrolytic solution is a solution in which a salt having a lithium ion and having anion species such as tetrafluoroborate or hexafluorophosphate is dissolved in an organic solvent such as propylene carbonate, ethylene carbonate, dimethyl carbonate, diethyl carbonate, or methylethyl carbonate.

However, both the electrode materials and the electrolytic solution are not limited to the above examples and the combinations, and any ordinary materials may be used.

A lithium-ion secondary battery using the separator for power storage device of the present embodiment can be constituted by impregnating the separator part with an organic electrolytic solution and holding the electrolytic solution there, and by separating the both electrodes through the use of the separator.

There is usually used, as a positive electrode material, an electrode in which lithium cobaltate or lithium nickelate, lithium manganite or a combination thereof is coated and bound onto a surface of a metal foil being a collector through the use of a binder.

There is usually used, as a negative electrode material, an electrode in which black lead or graphite is coated and bound onto a surface of a metal foil being a collector by the use of a binder, in a similar way to the lithium-ion capacitor.

The organic electrolytic solution is, usually, a solution in which a salt having a lithium ion and having anion species such as tetrafluoroborate or hexafluorophosphate is dissolved in an organic solvent such as propylene carbonate, ethylene carbonate, dimethyl carbonate, diethyl carbonate, or methylethyl carbonate.

However, both the electrode materials and the electrolytic solution are not limited to the above examples and the combinations, and any ordinary materials may be used.

[Explanation of Separator]

The separator for power storage device of the present embodiment uses the beatable regenerated cellulose fiber as at least one layer of the separators, and is within the range in which, when the CSF value of the separator is X [ml] and the tear index of the cross direction (CD) is Y [mN·m²/g], the CSF value X and the tear index Y are within the ranges satisfying the following Formulae 1 to 3 at the same time. More preferably, the CSF value X and the tear index Y are within the ranges satisfying the following Formulae 1 to 4 at the same time. Further preferably, the separator has at least one layer within the ranges satisfying the following Formulae 2 to 5 at the same time. Note that the "cross direction (CD)" of the separator means the direction of width of the separator wound in a longitudinal manner.

$$0 \leq X \leq 150 \qquad \text{Formula 1:}$$

$$10 \leq Y \leq 70 \qquad \text{Formula 2:}$$

$$Y \geq 0.3X - 5 \qquad \text{Formula 3:}$$

$$Y \leq 0.1X + 40 \qquad \text{Formula 4:}$$

$$0 \leq X \leq 50 \qquad \text{Formula 5:}$$

The separator is excellent in the tearing strength and has a high denseness, when satisfying the Formulae 1 to 3 at the same time, and thus it is possible to reduce both of breakage defect rate and short-circuit defect rate, in using the separator for power storage device.

In addition, when satisfying the Formulae 1 to 4 at the same time, it is possible to enhance the denseness of the separator more and to reduce the short-circuit defect rate more.

Furthermore, when satisfying the Formulae 2 to 5 at the same time, it is possible to further enhance the denseness of the separator and to further reduce the leakage current value.

In the Formula 1, when the CSF value X of the separator is larger than 150 ml, the denseness of the separator is lowered, and thus there is a danger that the short circuit defect rate and the leakage current value of the power storage device are increased.

In the Formula 2, when the tear index Y exceeds the upper limit of the Formula 2, the short circuit defect rate and the leakage current value of the power storage device are increased.

On the other hand, when the tear index Y is below the lower limit of the Formula 2, the breakage defect of the separator in the production steps of the power storage device is increased.

The thickness of the separator is preferably 10 to 80 μm. When the thickness is below 10 μm, the short circuit defect rate and the leakage current value are increased. In addition, when the thickness exceeds 80 μm, there is a case where an electrode housing area cannot be secured or a case where the internal resistance of the power storage device becomes worse.

The density of the separator is preferably 0.25 to 0.70 g/cm³. When the density is below 0.25 g/cm³, the denseness of the separator is lowered to thereby increase the short circuit defect rate and the leakage current value. In addition, when the density exceeds 0.70 g/cm³, the internal resistance of the the power storage device increases.

Furthermore, as mentioned above, there can be obtained the separator of the present embodiment by the use of the raw material obtained by beating the beatable regenerated cellulose fiber, and by mixing and papermaking the two fibers of the fiber A and the fiber B which are fibers having different degrees of beating.

The reason why the fiber A and the fiber B which have different degrees of beating are mixed is that the features of the fiber A and the fiber B are achieved at the same time.

The separator using the fiber A having the low degree of beating alone is excellent in the tearing strength, but is lack in the denseness.

On the other hand, the separator using the fiber B having the high degree of beating alone is excellent in the denseness, but has weak tearing strength.

It can be seen that the separator of the present invention is excellent in at least one property of the denseness and the tearing strength by making a comparison between the separator of the present invention obtained by mixing and making, into a sheet form, the fiber A and the fiber B and the separator obtained by making, into a sheet form, the raw material singly beaten to the same CSF value. The raw material beaten solely has weak tearing strength because of being micronized in comparison with the fiber A, and is lack in the denseness because of not being so micronized in comparison with the fiber B.

The role required for the fiber A is to enhance the tearing strength of the separator. The regenerated cellulose fibers having a lower degree of beating than the fiber B are intermingled with each other to thereby constitute a three-dimensional network structure, and the crossing point of the network structure is supported by bonding with the fibrils derived from the fiber A, and the fiber B, and thus the tearing strength of the separator is enhanced. Furthermore, since the fiber is the regenerated cellulose fiber beaten although the beating degree of the regenerated cellulose fiber is not so high as the fiber B having a high degree of beating, the denseness of the separator and the resistance are not damaged.

The beaten raw material has preferably the CSF value of 350 to 0 ml as the degree of beating of the fiber A. When the CSF value is more than 350 ml, the tearing strength cannot be enhanced. Namely, when the CSF value is larger than 350 ml, there are many fibers having a low degree of beating, and since the bonding between the fibers is weak, the resistance of the fiber against drawing is weak even if the three-dimensional network structure is constituted. Furthermore, since the degree of beating of the fiber A is too low, the denseness cannot be maintained even in the presence of the fiber B, and there is a case where the leakage current value and the short circuit defect rate of the electric double-layer capacitor are increased. In addition, when the degree of beating of the fiber is made high until the CSF value turns upward after the CSF value is once lowered to the lower limit (0 ml or + value), the fiber is excessively micronized, and thus in the similar way to the above, the resistance of the fiber against drawing is weak and the tearing strength of the separator is extremely lowered.

A blending ratio of the fiber A is preferably 20 to 80% by mass. When the blending ratio is less than 20% by mass, the tearing strength becomes lowered. When the blending ratio exceeds 80% by mass, the sheet obtained by papermaking is not uniform, and thus the short circuit defect rate and the leakage current value of the electric double-layer capacitor are increased.

The role required for the fiber B is to enhance the denseness of the separator. The denseness of the separator is enhanced by embedding the space of the separator with the regenerated cellulose fiber having the high degree of beating.

The degree of beating of the fiber B is preferably a CSF value of 1 to 500 ml in which the CSF value of the beaten raw material is once lowered to the lower limit (0 ml or + value) and then turns upward by further beating. When the CSF value of the fiber B is before the reaching of the lower limit or is the lower limit, the micronization of the fiber B is not sufficient, and the texture of the sheet obtained by mixing with the fiber A is not uniform, and thus the short circuit defect rate and the leakage current value of the electric double-layer capacitor are increased. When the CSF value is once lowered to the lower limit, then turns upward by further beating and the CSF value exceeds 500 ml, the fiber is excessively micronized, and thus the fiber is not suitable as a raw material for papermaking.

A blending ratio of the fiber B is preferably 20 to 80% by mass. When the blending ratio is less than 20% by mass, the texture of the sheet obtained by papermaking is not uniform, and thus the short circuit defect rate and the leakage current value of the electric double-layer capacitor are increased. When the blending ratio exceeds 80% by mass, the tearing strength of the separator becomes lowered.

Furthermore, in the separator for power storage device of the present invention, for the following reason, only the regenerated cellulose fiber is blended, but a natural cellulose fiber and other synthetic fiber are not blended.

The fibril obtained by beating the regenerated cellulose fiber has a small fiber diameter and a high rigidity. Accordingly, since the fibers and fibrils are bonded by hydrogen bond or the like at the crossing point, but the fibers and fibrils are not bound in the form of film with each other on a plane or at a point, with the result that there is the feature that the resistance does not become worse.

On the other hand, the natural cellulose fiber has a low rigidity and a strong bonding power between the fibers. Namely, at the crossing point of the natural cellulose fibers, the fibers are not only intermingled, but also, in the drying step of the sheet, the fibers are adsorbed through hydrogen bond or the like to thereby be adhered between planes, between points, or between the combination of the plane and the point. As a result, the resistance becomes worse.

The synthetic fiber is different from the cellulose fiber, and is only intermingled at the crossing point of the fibers, and the bonding power between the fibers is weak, and has various problems. For example, when the synthetic fiber is blended as the fiber A, the tearing strength is weak. This is because the fiber has low resistance against drawing. Furthermore, since the adsorption power among the regenerated cellulose fibers is inhibited, the denseness of the separator becomes lowered. Moreover, for example, also when the micronized synthetic fiber is blended as the fiber B, since the synthetic fiber is inserted between the regenerated cellulose fibers to thereby inhibit the adsorption of the regenerated cellulose fibers by hydrogen bond or the like, the short circuit defect is increased. It is possible to enhance the sheet strength by heat-fusion or adherence through the use of various binder fibers or the like, but when fusion portions are increased, the resistance becomes worse.

AS the regenerated cellulose fiber, there are: a cupramonium regenerated cellulose fiber obtained by a wet spinning method; a viscose regenerated cellulose fiber; and a solvent-spun regenerated cellulose fiber obtained by the use of a solution in which a cellulose is dissolved in a molecular state, in an organic solvent such as N-methylmorphorine-N-oxide, as a spinning dope; and the like.

Among them, typical beatable regenerated cellulose fibers include a polynosic rayon as the viscose-regenerated cellulose fiber, and a Lyocell fiber as the solvent-spun regenerated cellulose fiber, and the fiber layer can be easily formed by the use of these regenerated cellulose fibers.

However, the above examples are not limiting, any of the beatable regenerated cellulose fibers may be used, and the polynosic rayon fiber and the Lyocell fiber the detailed configuration of which will be shown hereinafter are not limiting.

When the density is within the range of 0.25 to 0.70 $g/cm^3$, the thickness of the separator may be controlled by calendering processing, as necessary.

In addition, paper-strengthening processing may be applied, as necessary.

Furthermore, there may be used an additive usually used in the papermaking steps such as a dispersant or an antifoaming agent, as necessary.

The present inventors have found that, by adoption of the above configuration of the separator for power storage device, a satisfactory separator can be obtained both in the production step of the power storage device and in terms of properties of the power storage device. Namely, there is provided a satisfactory separator having an excellent internal resistance, a reduced short circuit defect rate and leakage current value, and an enhanced yield in the production step of the power storage device.

[Measuring Methods of Properties of Separator]

The specific measurements of the properties of the separator for power storage device of the present embodiment were carried out in the following conditions and methods.

[CSF of Separator]

The CSF value of the separator was measured in accordance with "JIS P8121-2 Pulp-Determination of drainability—Part 2: Canadian Standard freeness method".

[Thickness]

The thickness of the separator was measured in accordance with the method of using a micrometer of "5.1.1 Measuring tools and measuring method a case where an outer micrometer is used" defined in "JIS C 2300-2 "Cellulose papers for electrical purposes—Part 2: Method of test" 5.1 Thickness" and of folding a sheet ten times in accordance with "5.1.3 Case that a thickness is measured by folding a paper".

[Density]

The density of the separator which was completely dried was measured in accordance with the Method B defined in "JIS C 2300-2 "Cellulose papers for electrical purposes—Part 2: Method of test" 7.0 A Density".

[Tear Index]

The tearing strength of the separator in the cross direction (CD) was measured in accordance with the method defined in "JIS P 8116 "Paper-Determination of tearing resistance—Elmendorf tearing tester method"". Next, the tear index was calculated by dividing the thus obtained value of the tearing strength by the basis weight of the separator.

[Production of Electric Double-Layer Capacitor Using Separator]

Hereinafter, there will be explained a method for producing an electric double-layer capacitor using the separator for power storage device of the present exemplary embodiment.

A wound-type electric double-layer capacitor was fabricated by winding of an active carbon electrode and the separator of the present invention to give an electric double-layer capacitor element. The element was stored in a cylindrical aluminum case with a bottom, and after injection of an electrolytic solution obtained by dissolving tetraethylammonium tetrafluoroborate as an electrolyte into a propylene carbonate solvent and being subjected to vacuum impregnation with the electrolytic solution, there was fabricated an electric double-layer capacitor, by sealing with a sealant rubber.

A lamination-type electric double-layer capacitor was fabricated by alternate folding of an active carbon electrode and the separator of the present invention to give an electric double-layer capacitor element. The element was stored in an aluminum case, and after injection of an electrolytic solution obtained by dissolving triethylmethylammonium hexafluorophosphate into acetonitrile and being subjected to vacuum impregnation with the electrolytic solution, there was fabricated an electric double-layer capacitor, by sealing.

[Production of Lithium-Ion Capacitor Using Separator]

Hereinafter, there will be explained a method for producing a lithium-ion capacitor using the separator for power storage device of the present exemplary embodiment.

An active carbon electrode for a lithium-ion capacitor was used as the positive electrode material, and a graphite electrode was used as the negative electrode material. The separate and the electrode materials were alternately folded to give a lithium-ion capacitor element. The element was stored in a multilayered laminated film together with a foil for lithium pre-doping, and after injection of an electrolytic solution and being subjected to vacuum impregnation with the electrolytic solution, a lithium-ion capacitor was fabricated by sealing. There was used, as the electrolytic solution, one obtained by dissolution of lithium hexafluorophosphate as an electrolyte in a propylene carbonate solvent.

[Production of Lithium-Ion Secondary Battery Using Separator]

Hereinafter, there will be explained a method for producing a lithium-ion secondary battery using the separator for power storage device of the present exemplary embodiment.

A lithium cobaltate electrode for a lithium-ion secondary battery was used as the positive electrode material, and a graphite electrode was used as the negative electrode material, and a lithium-ion secondary battery element was obtained by winding of the materials together with the separator. The element was stored in a cylindrical case with a bottom, and after injection of an electrolytic solution obtained by dissolving tetraethylammonium tetrafluoroborate as an electrolyte into a propylene carbonate solvent, there was fabricated a lithium-ion secondary battery, by sealing with a press machine.

[Evaluation Method of Power Storage Device]

The specific evaluations of the properties of the power storage device of the present embodiment were carried out in the following conditions and methods.

[Electrostatic Capacity]

Electrostatic capacities of the electric double-layer capacitor and the lithium-ion capacitor were obtained by the constant current discharge method defined in "4.5 Electrostatic capacity" of "JIS C 5160-1 "Fixed electric double-layer capacitors for use in electronic equipment"".

[Discharge Capacity]

Discharge capacity of the lithium-ion secondary battery was measured in accordance with "8.4.1 Discharge performance test" defined in "JIS C 8715-1 "Secondary lithium cells and batteries for use in industrial applications—Part 1: Tests and requirements of performance"".

[Internal Resistance]

Internal resistances of the electric double-layer capacitor and the lithium-ion capacitor were measured in accordance with the alternating current (a.c.) resistance method defined in "4.6 Internal resistance" of "JIS C 5160-1 "Fixed electric double-layer capacitors for use in electronic equipment"".

Internal resistance of the lithium-ion secondary battery was measured in accordance with "8.6.3 Alternating current internal resistance" defined in "JIS C 8715-1 "Secondary lithium cells and batteries for use in industrial applications—Part 1: Tests and requirements of performance"".

[Leakage Current]

Leakage currents of the electric double-layer capacitor and the lithium-ion capacitor were measured in accordance with "4.7 Leakage current" defined in "JIS C 5160-1 "Fixed electric double-layer capacitors for use in electronic equipment"" under a condition of a voltage applying time of 30 minutes.

[Breakage Defect Rate]

A power storage device element was formed by the use of each separator and electrode. After repetition of the procedure 1000 times, the number of the power storage device elements not having been formed due to breakage of the separator was counted, and the number of the breakage defects was obtained. Then, the number of the breakage defects was divided by 1000, and the breakage defect rate was represented by a percentage. Note that, in the lamination-type power storage device, when being folded, a device in which, even if it was not broken, a portion such as the edge of a folded portion was torn, was also included in the breakage defect rate.

[Short Circuit Defect Rate]

The short circuit defect rate of the power storage device was considered to be a short circuit defect in a case where a charging voltage did not rise up to a rated voltage, and the numbers of the power storage devices considered as the short circuit defect were divided by the number of the power storage devices to be subjected to an electrostatic capacity measurement, namely, the number of elements capable of being wound without breakage defect, and the short circuit defect rate was represented by the percentage.

EXAMPLE

Hereinafter, the specific Examples according to the present invention, Comparative Examples and Conventional Examples will be explained.

Note that the separator of each Example was constituted by a papermaking method and by the use of the regenerated cellulose fiber.

As to the size of the power storage device, in a case of the wound type, the size was described in the order of diameter (mm)×height (mm), and in a case of the lamination type, the size was described in the order of width (mm)×depth (mm)×height (mm).

Example 1

There was used a papermaking raw material obtained by blending, as the fiber A, 20% by mass of a polynosic rayon fiber being a regenerated cellulose fiber having a CSF value of 0 ml, and as the fiber B, 80% by mass of a polynosic rayon fiber being a regenerated cellulose fiber having a CSF value of 1 ml in which the CSF value is once lowered to 0 ml (lower limit) and then turns upward by further beating, and thus there was obtained a separator having a thickness of 20.0 μm, a density of 0.450 g/cm³, and a tear index of 15 mN·m²/g by a Fourdrinier papermaking method. A CSF value of the thus obtained separator was 0 ml.

There was formed, by the use of the separator, a lamination-type electric double-layer capacitor having a rated voltage of 2.5 V, a capacity of 3000 F, and a cell size of 55 mm×55 mm×155 mm, and then, there was produced an electric double-layer capacitor of Example 1.

Example 2

There was used a papermaking raw material obtained by blending, as the fiber A, 20% by mass of a Lyocell fiber being a regenerated cellulose fiber having a CSF value of 0 ml, and as the fiber B, 80% by mass of a Lyocell fiber being a regenerated cellulose fiber having a CSF value of 500 ml in which the CSF value is once lowered to 0 ml (lower limit) and then turns upward by further beating, and thus there was obtained a separator having a thickness of 10.0 μm, a density of 0.320 g/cm³, and a tear index of 14 mN·m²/g by a Fourdrinier papermaking method. A CSF value of the thus obtained separator was 10 ml.

There was formed, by the use of the separator, a lamination-type electric double-layer capacitor having a rated voltage of 2.5 V, a capacity of 3000 F, and a cell size of 55 mm×55 mm×155 mm, and then, there was produced an electric double-layer capacitor of Example 2.

Example 3

There was used a papermaking raw material obtained by blending, as the fiber A, 60% by mass of a Lyocell fiber being a regenerated cellulose fiber having a CSF value of 350 ml, and as the fiber B, 40% by mass of a Lyocell fiber being a regenerated cellulose fiber having a CSF value of 500 ml in which the CSF value is once lowered to 0 ml (lower limit) and then turns upward by further beating, and thus there was obtained a sheet by a Fourdrinier papermaking method. Subsequently, the sheet was subjected to calendaring processing to give a separator having a thickness of 18.0 μm, a density of 0.667 g/cm³, and a tear index of 38 mN·m²/g. A CSF value of the thus obtained separator was 0 ml.

There was formed, by the use of the separator, a lamination-type electric double-layer capacitor having a rated voltage of 2.5 V, a capacity of 3000 F, and a cell size of 55 mm×55 mm×155 mm, and then, there was produced an electric double-layer capacitor of Example 3.

Example 4

There was used a papermaking raw material obtained by blending, as the fiber A, 70% by mass of a Lyocell fiber being a regenerated cellulose fiber having a CSF value of 350 ml, and as the fiber B, 30% by mass of a Lyocell fiber being a regenerated cellulose fiber having a CSF value of 20 ml in which the CSF value is once lowered to 0 ml (lower limit) and then turns upward by further beating, and thus there was obtained a separator having a thickness of 20.0 μm, a density of 0.400 g/cm³, and a tear index of 40 mN·m²/g by a Fourdrinier papermaking method. A CSF value of the thus obtained separator was 44 ml.

There was formed, by the use of the separator, a lamination-type electric double-layer capacitor having a rated voltage of 2.5 V, a capacity of 3000 F, and a cell size of 55 mm×55 mm×155 mm, and then, there was produced an electric double-layer capacitor of Example 4.

Example 5

A sheet was obtained by the use of the same papermaking raw material as in Example 4 and by a cylinder papermaking method. Subsequently, the sheet was subjected to paper-strengthening processing by impregnatation with and coating of an aqueous solution of cationized starch, and drying to thereby give a separator. The separator had a thickness of 15.0 μm, a density of 0.267 g/cm³, a tear index of 66 mN·m²/g, and a CSF value of 44 ml.

There was formed, by the use of the separator, a lamination-type electric double-layer capacitor having a rated voltage of 2.5 V, a capacity of 3000 F, and a cell size of 55 mm×55 mm×155 mm, and then, there was produced an electric double-layer capacitor of Example 5.

Comparative Example 1

There was used a papermaking raw material obtained by blending, as the fiber A, 40% by mass of a Lyocell fiber being a regenerated cellulose fiber having a CSF value of 10 ml, and as the fiber B, 60% by mass of a Lyocell fiber being a regenerated cellulose fiber having a CSF value of 200 ml in which the CSF value is once lowered to 0 ml (lower limit) and then turns upward by further beating, and thus there was obtained a separator having a thickness of 9.0 μm, a density of 0.389 g/cm³, and a tear index of 7 mN·m²/g by a Fourdrinier papermaking method. A CSF value of the thus obtained separator was 0 ml.

There was formed, by the use of the separator, a lamination-type electric double-layer capacitor having a rated voltage of 2.5 V, a capacity of 3000 F, and a cell size of 55 mm×55 mm×155 mm, and then, there was produced an electric double-layer capacitor of Comparative Example 1.

Comparative Example 2

There was used a papermaking raw material obtained by blending, as the fiber A, 70% by mass of a Lyocell fiber being a regenerated cellulose fiber having a CSF value of 300 ml, and as the fiber B, 30% by mass of a Lyocell fiber being a regenerated cellulose fiber having a CSF value of 1 ml in which the CSF value is once lowered to 0 ml (lower limit) and then turns upward by further beating, and thus there was obtained a separator having a thickness of 10.5 μm, a density of 0.238 g/cm³, and a tear index of 17 mN·m²/g by a Fourdrinier papermaking method. A CSF value of the thus obtained separator was 90 ml.

There was formed, by the use of the separator, a lamination-type electric double-layer capacitor having a rated voltage of 2.5 V, a capacity of 3000 F, and a cell size of 55 mm×55 mm×155 mm, and then, there was produced an electric double-layer capacitor of Comparative Example 2.

Comparative Example 3

There was used a papermaking raw material obtained by blending, as the fiber A, 15% by mass of a Lyocell fiber being a regenerated cellulose fiber having a CSF value of 0 ml, and as the fiber B, 85% by mass of a Lyocell fiber being a regenerated cellulose fiber having a CSF value of 300 ml in which the CSF value is once lowered to 0 ml (lower limit) and then turns upward by further beating, and thus there was obtained a sheet by a Fourdrinier papermaking method.

Subsequently, the sheet was subjected to paper-strengthening processing by impregnatation with and coating of an aqueous solution of polyacrylamide resin, and drying to thereby give a separator. The separator had a thickness of 13.0 μm, a density of 0.269 g/cm$^3$, a tear index of 8 mN·m$^2$/g, and a CSF value of 0 ml.

There was formed, by the use of the separator, a lamination-type electric double-layer capacitor having a rated voltage of 2.5 V, a capacity of 3000 F, and a cell size of 55 mm×55 mm×155 mm, and then, there was produced an electric double-layer capacitor of Comparative Example 3.

Comparative Example 4

There was used a papermaking raw material obtained by blending, as the fiber A, 20% by mass of a Lyocell fiber being a regenerated cellulose fiber having a CSF value of 0 ml, and as the fiber B, 80% by mass of a Lyocell fiber being a regenerated cellulose fiber having a CSF value of 450 ml in which the CSF value is once lowered to 0 ml (lower limit) and then turns upward by further beating, and thus there was obtained a sheet by a Fourdrinier papermaking method. Subsequently, the sheet was subjected to calendaring processing to thereby give a separator having a thickness of 12.0 μm, a density of 0.750 g/cm$^3$, and a tear index of 4 mN·m$^2$/g. A CSF value of the thus obtained separator was 5 ml.

There was formed, by the use of the separator, a lamination-type electric double-layer capacitor having a rated voltage of 2.5 V, a capacity of 3000 F, and a cell size of 55 mm×55 mm×155 mm, and then, there was produced an electric double-layer capacitor of Comparative Example 4.

Conventional Example 1

By the use of a papermaking raw material having a CSF value of 100 ml in which the CSF value is once lowered to 0 ml (lower limit) and then turns upward by further beating of a Lyocell fiber being a regenerated cellulose fiber, there was obtained a separator having a thickness of 12.0 μm, a density of 0.333 g/cm$^3$, and a tear index of 10 mN·m$^2$/g. A CSF value of the thus obtained separator was 100 ml.

There was formed, by the use of the separator, a lamination-type electric double-layer capacitor having a rated voltage of 2.5 V, a capacity of 3000 F, and a cell size of 55 mm×55 mm×155 mm, and then, there was produced an electric double-layer capacitor of Conventional Example 1.

Conventional Example 2

There was obtained, according to the method of Example 1 of JP 2014-123607 A, a cellulose microporous film having a thickness of 15.0 μm, a density of 0.400 g/cm$^3$, and a tear index of 5 mN·m$^2$/g. Since the separator was not a sheet made of fibers, it was impossible to measure a CSF value.

There was formed, by the use of the separator, a lamination-type electric double-layer capacitor having a rated voltage of 2.5 V, a capacity of 3000 F, and a cell size of 55 mm×55 mm×155 mm, and then, there was produced an electric double-layer capacitor of Conventional Example 2.

Example 6

There was used a papermaking raw material obtained by blending, as the fiber A, 70% by mass of a Lyocell fiber being a regenerated cellulose fiber having a CSF value of 250 ml, and as the fiber B, 30% by mass of a Lyocell fiber being a regenerated cellulose fiber having a CSF value of 5 ml in which the CSF value is once lowered to 0 ml (lower limit) and then turns upward by further beating, and thus there was obtained a separator having a thickness of 30.0 μm, a density of 0.400 g/cm$^3$, and a tear index of 50 mN·m$^2$/g by a Fourdrinier papermaking method. A CSF value of the thus obtained separator was 131 ml.

There was formed, by the use of the separator, a wound-type electric double-layer capacitor having a rated voltage of 2.5 V, a capacity of 300 F, and a cell size of 35 mm×60 mm, and then, there was produced an electric double-layer capacitor of Example 6.

Example 7

There was used a papermaking raw material obtained by blending, as the fiber A, 40% by mass of a Lyocell fiber being a regenerated cellulose fiber having a CSF value of 0 ml, and as the fiber B, 60% by mass of a Lyocell fiber being a regenerated cellulose fiber having a CSF value of 500 ml in which the CSF value is once lowered to 0 ml (lower limit) and then turns upward by further beating, and thus there was obtained a separator having a thickness of 35.0 μm, a density of 0.429 g/cm$^3$, and a tear index of 22 mN·m$^2$/g by a Fourdrinier papermaking method. A CSF value of the thus obtained separator was 0 ml.

There was formed, by the use of the separator, a wound-type electric double-layer capacitor having a rated voltage of 2.5 V, a capacity of 300 F, and a cell size of 35 mm×60 mm, and then, there was produced an electric double-layer capacitor of Example 7.

Comparative Example 5

There was used a papermaking raw material obtained by blending, as the fiber A, 70% by mass of a Lyocell fiber being being a regenerated cellulose fiber having a CSF value of 50 ml in which the CSF value is once lowered to 0 ml (lower limit) and then turns upward by further beating, and as the fiber B, 30% by mass of a Lyocell fiber being a regenerated cellulose fiber having a CSF value of 150 ml in which the CSF value is once lowered to 0 ml (lower limit) and then turns upward by further beating, and thus there was obtained a separator having a thickness of 30.0 μm, a density of 0.333 g/cm$^3$, and a tear index of 11 mN·m$^2$/g by a Fourdrinier papermaking method. A CSF value of the thus obtained separator was 61 ml.

There was formed, by the use of the separator, a wound-type electric double-layer capacitor having a rated voltage of 2.5 V, a capacity of 300 F, and a cell size of 35 mm×60 mm, and then, there was produced an electric double-layer capacitor of Comparative Example 5.

Comparative Example 6

There was used a papermaking raw material obtained by blending, as the fiber A, 20% by mass of a Lyocell fiber by mass of a Lyocell fiber being a regenerated cellulose fiber having a CSF value of 0 ml, and as the fiber B, 80% by mass of a Lyocell fiber being a regenerated cellulose fiber having a CSF value of 650 ml in which the CSF value is once lowered to 0 ml (lower limit) and then turns upward by further beating, and thus there was obtained a separator having a thickness of 35.0 μm, a density of 0.343 g/cm$^3$, and a tear index of 72 mN·m$^2$/g by a cylinder papermaking method. A CSF value of the thus obtained separator was 20 ml. There was formed, by the use of the separator, a wound-type electric double-layer capacitor having a rated voltage of 2.5 V, a capacity of 300 F, and a cell size of 35 mm×60 mm, and then, there was produced an electric double-layer capacitor of Comparative Example 6.

Conventional Example 3

There was obtained, by the use of a regenerated cellulose fiber having a CSF value of 0 ml as a papermaking raw material, a separator having a thickness of 30.0 μm, a density of 0.400 g/cm³, and a tear index of 5 mN·m²/g by a Fourdrinier papermaking method. A CSF value of the thus obtained separator was 0 ml.

There was formed, by the use of the separator, a wound-type electric double-layer capacitor having a rated voltage of 2.5 V, a capacity of 300 F, and a cell size of 35 mm×60 mm, and then, there was produced an electric double-layer capacitor of Conventional Example 3.

Example 8

There was used a papermaking raw material obtained by blending, as the fiber A, 60% by mass of a Lyocell fiber being being a regenerated cellulose fiber having a CSF value of 300 ml, and as the fiber B, 40% by mass of a Lyocell fiber being a regenerated cellulose fiber having a CSF value of 1 ml in which the CSF value is once lowered to 0 ml (lower limit) and then turns upward by further beating, and thus there was obtained a separator having a thickness of 45.0 μm, a density of 0.444 g/cm³, and a tear index of 27 mN·m²/g by a Fourdrinier papermaking method. A CSF value of the thus obtained separator was 82 ml.

There was formed, by the use of the separator, a wound-type electric double-layer capacitor having a rated voltage of 2.5 V, a capacity of 100 F, and a cell size of 25 mm×45 mm, and then, there was produced an electric double-layer capacitor of Example 8.

Example 9

A sheet was obtained by the use of the same papermaking raw material as in Example 8 and by a cylinder papermaking method. Subsequently, the sheet was subjected to paper-strengthening processing by impregnatation with and coating of an aqueous solution of carboxymethyl cellulose, and drying to thereby give a separator. The separator had a thickness of 45.0 μm, a density of 0.267 g/cm³, a tear index of 52 mN·m²/g, and a CSF value of 82 ml.

There was formed, by the use of the separator, a wound-type electric double-layer capacitor having a rated voltage of 2.5 V, a capacity of 100 F, and a cell size of 25 mm×45 mm, and then, there was produced an electric double-layer capacitor of Example 9.

Example 10

There was used a papermaking raw material obtained by blending, as the fiber A, 80% by mass of a Lyocell fiber being a regenerated cellulose fiber having a CSF value of 350 ml, and as the fiber B, 20% by mass of a Lyocell fiber being a regenerated cellulose fiber having a CSF value of 20 ml in which the CSF value is once lowered to 0 ml (lower limit) and then turns upward by further beating, and thus there was obtained a separator having a thickness of 40.0 μm, a density of 0.500 g/cm, and a tear index of 40 mN·m²/g by a Fourdrinier papermaking method. A CSF value of the thus obtained separator was 138 ml.

There was formed, by the use of the separator, a wound-type electric double-layer capacitor having a rated voltage of 2.5 V, a capacity of 100 F, and a cell size of 25 mm×45 mm, and then, there was produced an electric double-layer capacitor of Example 10.

Example 11

There was obtained, by the use of the same papermaking raw material as in Example 10 and by a cylinder papermaking method, a separator having a thickness of 40.0 μm, a density of 0.400 g/cm³, and a tear index of 68 mN·m²/g. A CSF value of the thus obtained separator was 138 ml.

There was formed, by the use of the separator, a wound-type electric double-layer capacitor having a rated voltage of 2.5 V, a capacity of 100 F, and a cell size of 25 mm×45 mm, and then, there was produced an electric double-layer capacitor of Example 11.

Example 12

There was used a papermaking raw material obtained by blending, as the fiber A, 50% by mass of a Lyocell fiber being a regenerated cellulose fiber having a CSF value of 100 ml, and as the fiber B, 50% by mass of a Lyocell fiber being a regenerated cellulose fiber having a CSF value of 3 ml in which the CSF value is once lowered to 0 ml (lower limit) and then turns upward by further beating, and thus there was obtained a separator having a thickness of 40.0 μm, a density of 0.400 g/cm³, and a tear index of 28 mN·m²/g by a Fourdrinier papermaking method. A CSF value of the thus obtained separator was 15 ml.

There was formed, by the use of the separator, a wound-type electric double-layer capacitor having a rated voltage of 2.5 V, a capacity of 100 F, and a cell size of 25 mm×45 mm, and then, there was produced an electric double-layer capacitor of Example 12.

Example 13

There was obtained a sheet having a thickness of 30.0 μm, a density of 0.444 g/cm³, a tear index of 27 mN·m²/g and a CSF value of 82 ml by the use of the same raw material as in Example 8 and by a Fourdrinier papermaking method. Then, there was performed on the obtained sheet, combination papermaking of a sheet formed by the use of a raw material having a CSF value of 200 ml and by a cylinder papermaking method, to thereby give a separator. The separator having a multilayered structure had a thickness of 45.0 μm, a density of 0.443 g/cm³, a tear index of 50 mN·m²/g and a CSF value of 110 ml.

There was formed, by the use of the separator, a wound-type electric double-layer capacitor having a rated voltage of 2.5 V, a capacity of 100 F, and a cell size of 25 mm×45 mm, and then, there was produced an electric double-layer capacitor of Example 13.

Comparative Example 7

There was used a papermaking raw material obtained by blending, as the fiber A, 80% by mass of a Lyocell fiber being a regenerated cellulose fiber having a CSF value of 400 ml, and as the fiber B, 20% by mass of a Lyocell fiber being a regenerated cellulose fiber having a CSF value of 1 ml in which the CSF value is once lowered to 0 ml (lower limit) and then turns upward by further beating, and thus there was obtained a separator having a thickness of 40.0

μm, a density of 0.350 g/cm³, and a tear index of 43 mN·m²/g by a Fourdrinier papermaking method. A CSF value of the thus obtained separator was 158 ml.

There was formed, by the use of the separator, a wound-type electric double-layer capacitor having a rated voltage of 2.5 V, a capacity of 100 F, and a cell size of 25 mm×45 mm, and then, there was produced an electric double-layer capacitor of Comparative Example 7.

Comparative Example 8

There was obtained, by the use of the same papermaking raw material as in Comparative Example 7 and by a cylinder papermaking method, a separator having a thickness of 40.0 μm, a density of 0.300 g/cm³, and a tear index of 69 mN·m²/g. A CSF value of the thus obtained separator was 158 ml.

There was formed, by the use of the separator, a wound-type electric double-layer capacitor having a rated voltage of 2.5 V, a capacity of 100 F, and a cell size of 25 mm×45 mm, and then, there was produced an electric double-layer capacitor of Comparative Example 8.

Conventional Example 4

There was used a papermaking raw material obtained by blending, as the fiber A, 25% by mass of a Lyocell fiber being a regenerated cellulose fiber having a CSF value of 625 ml, and as the fiber B, 85% by mass of a Lyocell fiber being a regenerated cellulose fiber having a CSF value of 10 ml in which the CSF value is once lowered to 0 ml (lower limit) and then turns upward by further beating, and thus there was obtained a separator having a thickness of 50.0 μm, a density of 0.360 g/cm³, and a tear index of 7 mN·m²/g by a Fourdrinier papermaking method. A CSF value of the thus obtained separator was 2 ml.

There was formed, by the use of the separator, a wound-type electric double-layer capacitor having a rated voltage of 2.5 V, a capacity of 100 F, and a cell size of 25 mm×45 mm, and then, there was produced an electric double-layer capacitor of Conventional Example 4.

Example 14

There was used a papermaking raw material obtained by blending, as the fiber A, 40% by mass of a Lyocell fiber being a regenerated cellulose fiber having a CSF value of 0 ml, and as the fiber B, 60% by mass of a Lyocell fiber being a regenerated cellulose fiber having a CSF value of 350 ml in which the CSF value is once lowered to 0 ml (lower limit) and then turns upward by further beating, and thus there was obtained a separator having a thickness of 80.0 μm, a density of 0.250 g/cm³, and a tear index of 43 mN·m²/g by a cylinder papermaking method. A CSF value of the thus obtained separator was 0 ml.

There was formed, by the use of the separator, a wound-type electric double-layer capacitor having a rated voltage of 2.5 V, a capacity of 3 F, and a cell size of 8 mm×20 mm, and then, there was produced an electric double-layer capacitor of Example 14.

Example 15

There was used a papermaking raw material obtained by blending, as the fiber A, 80% by mass of a Lyocell fiber being a regenerated cellulose fiber having a CSF value of 100 ml, and as the fiber B, 20% by mass of a Lyocell fiber being a regenerated cellulose fiber having a CSF value of 15 ml in which the CSF value is once lowered to 0 ml (lower limit) and then turns upward by further beating, and thus there was obtained a separator having a thickness of 80.0 μm, a density of 0.313 g/cm³, and a tear index of 13 mN·m²/g by a Fourdrinier papermaking method. A CSF value of the thus obtained separator was 45 ml.

There was formed, by the use of the separator, a wound-type electric double-layer capacitor having a rated voltage of 2.5 V, a capacity of 3 F, and a cell size of 8 mm×20 mm, and then, there was produced an electric double-layer capacitor of Example 15.

Comparative Example 9

There was used a papermaking raw material obtained by blending, as the fiber A, 85% by mass of a Lyocell fiber being a regenerated cellulose fiber having a CSF value of 100 ml, and as the fiber B, 15% by mass of a Lyocell fiber being a regenerated cellulose fiber having a CSF value of 15 ml in which the CSF value is once lowered to 0 ml (lower limit) and then turns upward by further beating, and thus there was obtained a separator having a thickness of 80.0 μm, a density of 0.375 g/cm³, and a tear index of 77 mN·m²/g by a cylinder papermaking method. A CSF value of the thus obtained separator was 50 ml.

There was formed, by the use of the separator, a wound-type electric double-layer capacitor having a rated voltage of 2.5 V, a capacity of 3 F, and a cell size of 8 mm×20 mm, and then, there was produced an electric double-layer capacitor of Comparative Example 9.

Comparative Example 10

There was used a papermaking raw material obtained by blending, as the fiber A, 50% by mass of a Lyocell fiber being a regenerated cellulose fiber having a CSF value of 100 ml, and as the fiber B, 50% by mass of a Lyocell fiber being a regenerated cellulose fiber having a CSF value of 0 ml, and thus there was obtained a separator having a thickness of 80.0 μm, a density of 0.375 g/cm³, and a tear index of 80 mN·m²/g by a cylinder papermaking method. A CSF value of the thus obtained separator was 50 ml.

There was formed, by the use of the separator, a wound-type electric double-layer capacitor having a rated voltage of 2.5 V, a capacity of 3 F, and a cell size of 8 mm×20 mm, and then, there was produced an electric double-layer capacitor of Comparative Example 10.

Conventional Example 5

There was used a papermaking raw material obtained by beating a Lyocell fiber being a regenerated cellulose fiber to a CSF value of 200 ml, and thus there was obtained a separator having a thickness of 85.0 μm, a density of 0.412 g/cm³, and a tear index of 90 mN·m²/g by a cylinder papermaking method. A CSF value of the thus obtained separator was 200 ml.

There was formed, by the use of the separator, a wound-type electric double-layer capacitor having a rated voltage of 2.5 V, a capacity of 3 F, and a cell size of 8 mm×20 mm, and then, there was produced an electric double-layer capacitor of Conventional Example 5.

Example 16

There was obtained, by the use of the same papermaking raw material as in Example 3 and by a Fourdrinier papermaking method, a separator having a thickness of 35.0 μm, a density of 0.400 g/cm³, and a tear index of 38 mN·m²/g. A CSF value of the thus obtained separator was 0 ml.

There was formed, by the use of the separator, a lithium-ion capacitor having a rated voltage of 3.8 V, a capacity of 1000 F, and a cell size of 180 mm×125 mm×6 mm, and then, there was produced a lithium-ion capacitor of Example 16.

Conventional Example 6

There was obtained, by the use of the same papermaking raw material as in Conventional Example 3 and by a Fourdrinier papermaking method, a separator having a thickness of 35.0 μm, a density of 0.451 g/cm³, and a tear index of 5 mN·m²/g. A CSF value of the thus obtained separator was 0 ml.

There was formed, by the use of the separator, a lithium-ion capacitor having a rated voltage of 3.8 V, a capacity of 1000 F, and a cell size of 180 mm×125 mm×6 mm, and then, there was produced a lithium-ion capacitor of Conventional Example 6.

Example 17

There was obtained, by the use of the same papermaking raw material as in Example 3 and by a Fourdrinier papermaking method, a sheet. Then, there was obtained, by subjecting the sheet to calendering processing, a separator having a thickness of 15.0 μm, a density of 0.600 g/cm³, and a tear index of 38 mN·m²/g. A CSF value of the thus obtained separator was 0 ml.

There was formed, by the use of the separator, a lithium-ion secondary battery having a rated voltage of 3.7 V, and a cell size of 18 mm×65 m, and then, there was produced a lithium-ion secondary battery of Example 17.

Conventional Example 7

There was formed, by the use of a polyolefin-made microporous film having a thickness of 15.0 μm, a density of 0.600 g/cm³ and a tear index of 5 mN·m²/g, a lithium-ion secondary battery having a rated voltage of 3.7 V and a cell size of 18 mm×65 mm, and then, there was produced a lithium-ion secondary battery of Conventional Example 7.

As described above, according to the aforementioned present embodiments, when the fiber A that enhances the tearing strength and the fiber B that enhances the denseness are blended, and the fiber A and the fiber B are composed of the regenerated cellulose fibers, and the blending ratio of the fiber A is 20 to 80% and the blending ratio of the fiber B is 20 to 80%, it is possible to provide a separator having the CSF value X and the tear index Y of the separator which satisfy the ranges of the following Formulae.

$0 \leq X \leq 150$          Formula 1:

$10 \leq Y \leq 70$          Formula 2:

$Y \geq 0.3X - 5$          Formula 3:

In Table 1, there are shown the evaluation results of the properties of each separator itself and the performances of the electric double-layer capacitors, as to Examples 1 to 15 of the present embodiment as described above, Comparative Examples 1 to 10 and Conventional Examples 1 to 5. In addition, in Table 2, there are shown the evaluation results of the properties of of each single separator and the performances of the lithium-ion capacitors, as to Example 16 of the present embodiment and Conventional Example 6. Additionally, in Table 3, there are shown the evaluation results of the properties of each single separator and the performances of the lithium-ion secondary batteries, as to Example 17 of the present embodiment and Conventional Example 7.

In Tables 1 to 3, in order to distinguish the degree of beating, the CFS value in which the CSF value is once lowered to 0 ml (lower limit) and then turns upward by further beating is represented by indicating a symbol *. Each of the various measurement values is an average value of a plurality of the samples.

Furthermore, in the properties of the separator of Example 13, the values after forming multilayered structure are described in the parentheses.

TABLE 1

| | Blending of separator | | | | Properties of separator | | | |
|---|---|---|---|---|---|---|---|---|
| | Fiber A | | Fiber B | | | | | |
| | CSF ml | Blending amount % | CSF ml | Blending amount % | Thickness μm | Density g/cm³ | Tear index mN · m²/g | Sheet CSF ml |
| Example 1 | 0 | 20 | *1 | 80 | 20.0 | 0.450 | 15 | 0 |
| Example 2 | 0 | 20 | *500 | 80 | 10.0 | 0.320 | 14 | 10 |
| Example 3 | 350 | 60 | *500 | 40 | 18.0 | 0.667 | 38 | 0 |
| Example 4 | 350 | 70 | *20 | 30 | 20.0 | 0.400 | 40 | 44 |
| Example 5 | 350 | 70 | *20 | 30 | 15.0 | 0.267 | 66 | 44 |
| Comparative Example 1 | 10 | 40 | *200 | 60 | 9.0 | 0.389 | 7 | 0 |
| Comparative Example 2 | 300 | 70 | *1 | 30 | 10.5 | 0.238 | 17 | 90 |
| Comparative Example 3 | 0 | 15 | *300 | 85 | 13.0 | 0.269 | 8 | 0 |
| Comparative Example 4 | 0 | 20 | *450 | 80 | 12.0 | 0.750 | 4 | 5 |
| Conventional Example 1 | — | — | *100 | 100 | 12.0 | 0.333 | 10 | 100 |
| Conventional Example 2 | — | — | — | — | 15.0 | 0.400 | 5 | — |
| Example 6 | 250 | 70 | *5 | 30 | 30.0 | 0.400 | 50 | 131 |
| Example 7 | 0 | 40 | *500 | 60 | 35.0 | 0.429 | 22 | 0 |
| Comparative Example 5 | *50 | 70 | *150 | 30 | 30.0 | 0.333 | 11 | 61 |
| Comparative Example 6 | 0 | 20 | *650 | 80 | 35.0 | 0.343 | 72 | 20 |
| Conventional Example 3 | 0 | 100 | — | — | 30.0 | 0.400 | 5 | 0 |
| Example 8 | 300 | 60 | *1 | 40 | 45.0 | 0.444 | 27 | 82 |
| Example 9 | 300 | 60 | *1 | 40 | 45.0 | 0.267 | 52 | 82 |
| Example 10 | 350 | 80 | *20 | 20 | 40.0 | 0.500 | 40 | 138 |
| Example 11 | 350 | 80 | *20 | 20 | 40.0 | 0.400 | 68 | 138 |
| Example 12 | 100 | 50 | *3 | 50 | 40.0 | 0.400 | 28 | 15 |
| Example 13 | 300 | 60 | *1 | 40 | 30 (45) | 0.444 (0.443) | 27 (50) | 82 (110) |
| Comparative Example 7 | 400 | 80 | *1 | 20 | 40.0 | 0.350 | 43 | 158 |

TABLE 1-continued

| | | | | | | | | |
|---|---|---|---|---|---|---|---|---|
| Comparative Example 8 | 400 | 80 | *1 | 20 | 40.0 | 0.300 | 69 | 158 |
| Conventional Example 4 | 625 | 25 | *10 | 75 | 50.0 | 0.360 | 7 | 2 |
| Example 14 | 0 | 40 | *350 | 60 | 80.0 | 0.250 | 43 | 0 |
| Example 15 | 100 | 80 | *15 | 20 | 80.0 | 0.313 | 13 | 45 |
| Comparative Example 9 | 100 | 85 | *15 | 15 | 80.0 | 0.375 | 77 | 50 |
| Comparative Example 10 | 100 | 50 | 0 | 50 | 80.0 | 0.375 | 80 | 50 |
| Conventional Example 5 | 200 | 100 | — | — | 85.0 | 0.412 | 90 | 200 |

| | Performances of electric double-layer capacitor | | | | |
|---|---|---|---|---|---|
| | Electrostatic capacity F | Breakage defect % | Internal resistance mΩ | Short circuit defect % | Leakage current mA |
| Example 1 | 3000 | 0.4 | 0.25 | 0.1 | 4.0 |
| Example 2 | 3000 | 0.9 | 0.22 | 0.4 | 4.5 |
| Example 3 | 3000 | 0.1 | 0.31 | 0.0 | 3.6 |
| Example 4 | 3000 | 0.2 | 0.24 | 0.6 | 4.1 |
| Example 5 | 3000 | 0.3 | 0.22 | 0.8 | 5.5 |
| Comparative Example 1 | 3000 | 1.6 | 0.20 | 2.2 | 8.8 |
| Comparative Example 2 | 3000 | 1.3 | 0.19 | 1.9 | 9.2 |
| Comparative Example 3 | 3000 | 1.5 | 0.21 | 0.8 | 7.8 |
| Comparative Example 4 | 3000 | 1.3 | 0.45 | 0.1 | 3.6 |
| Conventional Example 1 | 3000 | 1.8 | 0.30 | 0.1 | 3.6 |
| Conventional Example 2 | 3000 | 2.3 | 0.33 | 0.2 | 2.9 |
| Example 6 | 300 | 0.1 | 4.50 | 0.3 | 0.6 |
| Example 7 | 300 | 0.3 | 4.60 | 0.2 | 0.5 |
| Comparative Example 5 | 300 | 1.3 | 4.70 | 0.1 | 0.4 |
| Comparative Example 6 | 300 | 0 | 3.30 | 1.3 | 1.7 |
| Conventional Example 3 | 300 | 1.5 | 4.65 | 0.5 | 0.7 |
| Example 8 | 100 | 0.6 | 7.00 | 0.2 | 0.3 |
| Example 9 | 100 | 0.5 | 6.00 | 0.8 | 0.4 |
| Example 10 | 100 | 0.1 | 6.50 | 0.3 | 0.3 |
| Example 11 | 100 | 0 | 5.40 | 0.9 | 0.5 |
| Example 12 | 100 | 0.7 | 5.90 | 0.3 | 0.1 |
| Example 13 | 100 | 0 | 6.60 | 0.2 | 0.3 |
| Comparative Example 7 | 100 | 0.6 | 4.90 | 1.1 | 0.8 |
| Comparative Example 8 | 100 | 0.4 | 4.50 | 1.3 | 0.7 |
| Conventional Example 4 | 100 | 1.1 | 5.10 | 1.5 | 0.9 |
| Example 14 | 3 | 0.1 | 52.00 | 0.7 | 1.0 |
| Example 15 | 3 | 0.8 | 55.00 | 0.6 | 0.8 |
| Comparative Example 9 | 3 | 0.1 | 71.00 | 1.2 | 2.1 |
| Comparative Example 10 | 3 | 0 | 74.00 | 1.4 | 2.4 |
| Conventional Example 5 | 3 | 0 | 85.00 | 3.1 | 3.8 |

TABLE 2

| | Blending of separator | | | | Properties of separator | | | | Performances of lithium-ion capacitor | | | | |
|---|---|---|---|---|---|---|---|---|---|---|---|---|---|
| | Fiber A | | Fiber B | | | | | | | | | | |
| | CSF ml | Blending amount % | CSF ml | Blending amount % | Thickness μm | Density g/cm³ | Tear index mN·m²/g | Sheet CSF ml | Electrostatic capacity F | Breakage defect % | Internal resistance mΩ | Short circuit defect % | Leakage current mA |
| Example 16 | 350 | 60 | *500 | 40 | 35.0 | 0.400 | 38 | 0 | 1000 | 0.1 | 2.20 | 0.3 | 0.4 |
| Conventional Example 6 | 0 | 100 | — | — | 35.0 | 0.451 | 5 | 0 | 1000 | 1.1 | 2.25 | 0.4 | 0.5 |

TABLE 3

| | Blending of separator | | | | Properties of separator | | | | Performances of lithium-ion secondary battery | | | |
|---|---|---|---|---|---|---|---|---|---|---|---|---|
| | Fiber A | | Fiber B | | | | | | | | | |
| | CSF ml | Blending amount % | CSF ml | Blending amount % | Thickness μm | Density g/cm³ | Tear index mN·m²/g | Sheet CSF ml | Discharge capacity mAh | Breakage defect % | Internal resistance mΩ | Short circuit defect % |
| Example 17 | 350 | 60 | *500 | 40 | 15.0 | 0.600 | 38 | 0 | 2200 | 0.1 | 35 | 0.2 |
| Conventional Example 7 | — | — | — | — | 15.0 | 0.600 | 5 | — | 2200 | 0.1 | 60 | 0.2 |

Hereinafter, evaluation results will be explained with respect to each of Examples, Comparative Examples and Conventional Examples.

The electric double-layer capacitors fabricated by the use of the separators of Examples 1 to 5 have the breakage defect rates as low as 0.1 to 0.9% which are below 1%. Furthermore, the short circuit defect rates are as low as 0.0 to 0.8% which are below 1%. Moreover, the leakage current values are also sufficiently as low as 3.6 to 5.5 mA and the internal resistance values are also sufficiently as low as 0.22 to 0.31 mΩ.

On the other hand, since the thickness of the separator of Comparative Example 1 is as small as 9.0 μm, the breakage defect rate is as high as 1.6%, the short circuit defect rate is as high as 2.2%, and the leakage current value is as high as 8.8 m A. Accordingly, it can be seen that the thickness of the separator is preferably 10 μm or more.

In addition, since the density of the separator of Comparative Example 2 is as low as 0.238 g/cm$^3$, the breakage defect rate is as high as 1.3%, the short circuit defect rate is as high as 1.9%, and the leakage current value is as high as 9.2 m A. Accordingly, it can be seen that the density of the separator is preferably 0.25 g/cm$^3$ or more.

The tear indexes of the separators of Comparative Examples 3 and 4 are below the range of the Formula 2. Therefore, the breakage defect rates are as high as 1.5% and 1.3%, respectively. Furthermore, the density of the separator of Comparative Example 4 is as high as 0.75 g/cm$^3$, the internal resistance value of the electric double-layer capacitor is worse by 30% or more than those of Examples 1 to 5. Accordingly, it can be seen that the density of the separator is preferably 0.70 g/cm$^3$ or less.

Additionally, the separator of Conventional Example 1 uses, as the raw material, only the Lyocell fiber having a CSF value of 100 ml in which the CSF value is once lowered to 0 ml (lower limit) and then turns upward by further beating. Accordingly, the tear index of the separator is below the range of the Formula 3, and the breakage defect rate is as high as 1.8%.

The separator of Conventional Example 2 is a separator made of the regenerated cellulose microporous film. The tear index is below the range of the Formula 2, and the breakage defect rate is as high as 2.3%.

The electric double-layer capacitors fabricated by the use of the separators of Examples 6 and 7 have the breakage defect rates as low as 0.1 to 0.3 which are below 1%. Furthermore, the short circuit defect rates are as low as 0.2 to 0.3% which are below 1%. Moreover, the leakage current values are sufficiently as low as 0.5 to 0.6 m A and the internal resistances are sufficiently as low as 4.50 to 4.60Ω.

The fiber A of the separator of Comparative Example 5 has a CSF value of 50 ml in which the CSF value is once lowered to 0 ml (lower limit) and then turns upward by further beating. Accordingly, the tear index of the separator is below the range of the Formula 3, and the breakage defect rate is as high as 1.3%.

In addition, the fiber B of the separator of Comparative Example 6 has a CSF value of 650 ml in which the CSF value is once lowered to 0 ml (lower limit) and then turns upward by further beating. Therefore, during the papermaking steps of the separator, the excessively micronized fibers in the fiber B fall off from a papermaking wire. As a result, the tear index of the separator of Comparative Example 6 exceeds the range of the Formula 2, and the short circuit defect rate is as high as 1.3% and the leakage current value is also as high as 1.7 m A.

The tear index of the separator of Conventional Example 3 is below the range of the Formula 2, and the breakage defect rate is as high as 1.5%. In addition, although the CSF value of the separator of Conventional Example 3 is 0 ml, which is the same as the CSF value of the separator of Example 7, the breakage defect rate, the short circuit defect rate and the leakage current value of Example 7 are more excellent than in Conventional Example 3, as a result. Accordingly, the separator obtained by mixing raw materials having different degrees of beating according to the present invention rather than materials that are singly beaten, can enhance both of the denseness and the tearing strength, with the result that it can be seen that the breakage defect rate, the short circuit defect rate and the leakage current value of the electric double-layer capacitor can be reduced.

The electric double-layer capacitors fabricated by the use of the separators of Example 8 to Example 13 have the breakage defect rates as low as 0.0 to 0.7% which are below 1%. Furthermore, the short circuit defect rates are as low as 0.2 to 0.9% which are below 1%. The leakage current values of these Examples are sufficiently as small as 0.1 to 0.5 mA. On the other hand, the leakage current value of Conventional Example 4 where the synthetic fiber is used is as large as 0.9 mA. The leakage current values of Examples are improved by 30% or more in comparison with that of Conventional Example 4.

The separator of Example 8 is one obtained by the use of the same papermaking raw material as that of Example 9, and the separator of Example 10 is obtained by the use of the same papermaking raw material as that of Example 11 according to the Fourdrinier papermaking method. The separators of Examples 8 and 10 satisfy the Formula 4, but the separators of Examples 9 and 11 do not satisfy the Formula 4. The short circuit defect rate of each of the electric double-layer capacitors of Examples 8 and 10 is lower than that of each of the electric double-layer capacitors of Examples 9 and 11. Accordingly, it can be seen that, when the capacitor satisfies not only the Formulae 1 to 3 but also the Formula 4, the short circuit defect rate can be further reduced.

The separator of Example 12 satisfies the Formula 5 in addition to the Formulae 2 to 4, at the same time. The leakage current value of the electric double-layer capacitor of Example 12 is lower than that of each of the electric double-layer capacitors of Examples 8 and 10 in which the Formula 5 is not satisfied. Accordingly, it can be seen that when the capacitor satisfies not only the Formulae 1 to 4 but also the Formula 5, the leakage current value can be further reduced.

The separator of Example 13 is a separator obtained by combination papermaking of the Lyocell fiber having a low degree of beating, on the separator using the same papermaking raw material as in Example 8. The electric double-layer capacitor of Example 13 has a low short circuit defect rate and also has a small leakage current value. In addition, since the tear index is improved due to the combination of layers having a low degree of beating, thereby resulting in no generation of breakage defect.

The separators of Comparative Examples 7 and 8 has a CSF value exceeding the range of the Formula 1, and thus the short circuit defect rate exceeds 1% and the leakage current value is increased by 30% or more in comparison with each of the leakage current values of Examples 8 to 13.

The separator of Conventional Example 4 is a separator in which the polyester fiber is blended, and the tear index is below the range of the Formula 2. The reason is that the adsorption force between the fibers becomes lowered due to blending of the synthetic fiber. In addition, for the same reason, resultantly, the shielding property of the separator is also lowered, and the breakage defect rate and the short circuit defect rate are as high as 1.1% and 1.5%, respectively, and also the leakage current value is also as large as 0.9 mA.

Each of the electric double-layer capacitors fabricated by the use of the separators of Examples 14 and 15 has the breakage defect rate as low as 0.1 to 0.8% which is below 1%. In addition, the short circuit defect rate is as low as 0.6 to 0.7% which is below 1%. Furthermore, the leakage current value is sufficiently as low as 0.8 to 1.0 m A. Each of the internal resistance values of these Examples is 52.0 to 55.0 mΩ which is sufficiently small. On the other hand, the internal resistance value of Conventional Example 5 is as large as 85 mΩ. Each of the internal resistance values of Examples is improved as much as 30% or more in comparison with that of Conventional Example 5.

The separator of Comparative Example 9 is obtained by blending 85% by mass of the fiber A and 15% by mass of the fiber B, and the tear index exceeds the range of the Formula 2. Accordingly, the short circuit defect rate of the electric double-layer capacitor of Comparative Example 9 is as high as 1.2% and the leakage current value is also as large as 2.1 mA. It is considered that this is because the denseness is not enhanced because the blending amount of the fiber B is small.

The CSF value of the fiber B of the separator of Comparative Example 10 is 0 ml (lower limit). Accordingly, the tear index of the separator exceeds the range of the Formula 2, and thus the short circuit defect rate is as high as 1.4%, and the leakage current value is also as large as 2.4 mA.

The separator of Conventional Example 5 is obtained by papermaking by the use of the raw material obtained by beating the regenerated cellulose fiber to a CSF value of 200 ml. Since the CSF value of the regenerated cellulose fiber is large, the value of the tear index is extremely large, and the breakage defect did not occur. However, the CSF value of the separator exceeds the range of the Formula 1 and further the tear index exceeds the range of the Formula 2, and thus the short circuit defect rate is as high as 3.1% and the leakage current value is also as large as 3.8 mA. Furthermore, since the thickness is also as thick as 85.0 µm, the internal resistance value of the electric double-layer capacitor is large. Accordingly, it can be seen that the thickness of the separator is preferably 80.0 µm or less.

The lithium-ion capacitor of Example 16 is fabricated by the use of the same papermaking raw material as that of Example 3, the breakage defect rate is as low as 0.1% which is below 1%. In addition, the short circuit defect rate is as low as 0.3% which is below 1%. Additionally, the internal resistance value is also sufficiently as small as 2.20 mΩ.

The tear index of the separator of Conventional Example 6 is below the range of the Formula 2, and the breakage defect rate is as high as 1.1%. In addition, the CSF value of the separator of Conventional Example 6 is 0 ml, which is the same as each of the CSF values of the separators of Example 16, but resultantly, the breakage defect rate, the short circuit defect rate and the leakage current value of the separators of Example are more excellent than those of the separator of Conventional Example 6, respectively. Accordingly, in a similar way to the electric double-layer capacitor, the separator obtained by mixture of raw materials having different degrees of beating as in the present invention rather than raw materials that are singly beaten, can enhance both of the denseness and the tearing strength, with the result that it can be seen that the breakage defect rate, the short circuit defect rate and the leakage current value of the lithium-ion capacitor can also be reduced.

The lithium-ion secondary battery of Example 17 is fabricated by the use of the same papermaking raw material as that of Example 3, and the breakage defect rate is as low as 0.1% which is below 1%. Furthermore, the short circuit defect rate is as low as 0.2% which is below 1%. In addition, the internal resistance value is also sufficiently as small as 35 mΩ. The internal resistance value is improved by 30% or more in comparison with that of Conventional Example 7.

The lithium-ion secondary battery of Conventional Example 7 uses the polyolefin-made microporous film as the separator. Although the density of the separator is the same as that of the separator of Example 17, the internal resistance value is as large as 60 mΩ. Accordingly, it can be seen that in order to reduce the resistance of the separator, it is preferable to use a separator composed of the regenerated cellulose fiber.

Figure 2:
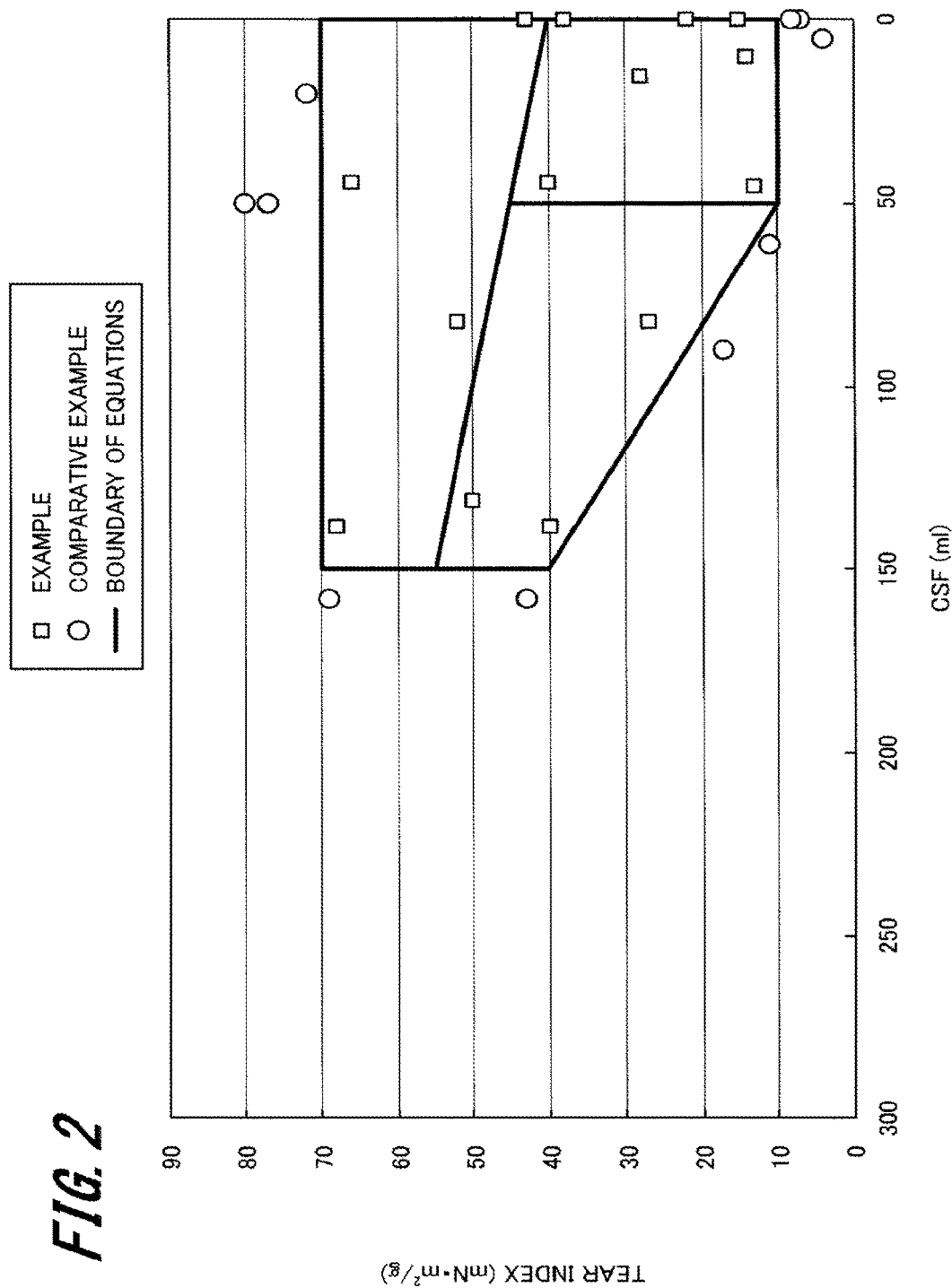
FIG. 2 is a graph in which the CSF values and the tear indexes of the separator are plotted with respect to each example of Examples and Comparative Examples.

Furthermore, with respect to each of Examples and Comparative Examples, the CSF value of the separator and the tear index are plotted in FIG. 2. In FIG. 2, the lines of boundaries in the range of the Formulae 1 to 5 are shown together with plotting of values in each Example.

From FIG. 2, each Example is within the ranges of the Formulae 1 to 3, but each comparative Example is outside of at least one range of the Formulae 1 to 3.

Moreover, in a case of making a comparison among the electric double-layer capacitors having the same capacity, the short circuit defect rate is more reduced when not only the Formulae 1 to 3 are satisfied, but also the Formula 4 is satisfied at the same time.

Furthermore, when the Formula 5 is also satisfied at the same time, the leakage current value is further reduced.

In addition, these separators are also applicable to a lithium-ion capacitor and a lithium-ion secondary battery.

According to the aforementioned present embodiment, when the fiber A that enhances the tearing strength and the fiber B that enhances the denseness are beaten to the ranges shown below, and the fiber A and the fiber B are the regenerated cellulose fibers, and the blending ratio of the fiber A is 20 to 80% by mass and the blending ratio of the fiber B is 20 to 80% by mass, it is possible to provide the separator in which the CSF value X [ml] and the tear index Y [mN·m$^2$/g] satisfy the ranges of the following Formulae. In addition, when the thickness of the separator is set to 10 to 80 µm, and the density is set to 0.25 to 0.70 g/cm$^3$, it is possible to provide a separator for power storage device having an excellent resistance property, denseness and tearing strength.

CSF value of Fiber A: CSF value 350 to 0 ml

CSF value of Fiber B: CSF value of 1 to 500 ml in which the CSF value is once lowered to 0 ml (lower limit) and then turns upward by further beating $$0 \leq X \leq 150 \qquad \text{Formula 1:}$$

$$10 \leq Y \leq 70 \qquad \text{Formula 2:}$$

$$Y \geq 0.3X - 5 \qquad \text{Formula 3:}$$

By the use of the aforementioned separator, it is possible to provide the power storage device having improved internal resistance value, short circuit defect rate and leakage current value, and also becomes possible to enhance yield at the production process of the power storage device.

In the above, there have been explained the examples in which the separator of the present embodiment is used for each of the electric double-layer capacitor, the lithium-ion capacitor, and the lithium-ion secondary battery.

Note that there have been omitted detailed explanations as to the other configuration and production methods of the electric double-layer capacitor, the lithium-ion capacitor, and the lithium-ion secondary battery.

In the electric double-layer capacitor, the lithium-ion capacitor, and the lithium-ion secondary battery according to the power storage device of the present invention, electrode materials, electrolytic solution materials, other members, and the like are not particularly limited, and various materials can be used.

In the aforementioned present embodiment, the CSF value of the fiber A is CSF value of 350 to 0 ml, and the CSF value of the fiber B is CSF value of 1 to 500 ml in which the value is once lowered to 0 ml (lower limit) and then turns upward by further beating. In addition, in each Example, as the fiber A and the fiber B, there are used fibers fabricated from the same kind of the regenerated cellulose fiber but have different degrees of beating.

In the present invention, as long as the properties of the separator satisfy the Formulae 1 to 3 at the same time, or satisfy the Formulae 1 to 4 at the same time, or satisfy the Formulae 1 to 5 at the same time, the composition of the beatable regenerated cellulose fiber constituting the separator is not particularly limited. As long the regenerated cellulose fiber satisfies the Formulae 1 to 3 at the same time, or satisfy the Formulae 1 to 4 at the same time, or satisfy the Formulae 1 to 5 at the same time, for example, it is possible to use three or more regenerated cellulose fibers having different degrees of beat, or to use a regenerated cellulose fiber having a CSF value which is outside of the range of the CSF value of the present embodiment, or to use the fiber A and the fiber B which have different kinds of regenerated cellulose fibers.

Furthermore, it is also possible to use a plurality of the separators of the present invention or to use one or more separators of the present invention, in a lamination manner.

INDUSTRIAL APPLICABILITY

The separator of the present invention is applicable to the electric double-layer capacitor, the lithium-ion capacitor, and the lithium-ion secondary battery, and is also applicable to various power storage devices such a lithium battery, a sodium ion battery and a solid electrolytic capacitor, and an aluminium electrolytic capacitor.

The invention claimed is:

1. A separator for power storage device, comprising: beatable regenerated cellulose fibers,
wherein a CSF value X [ml] and a tear index Y [mN·m²/g] of the separator are within ranges satisfying Formulae 1 to 3:

$$0 \leq X \leq 150;$$ Formula 1:

$$10 \leq Y \leq 70; \text{ and}$$ Formula 2:

$$Y \geq 0.3X - 5,$$ Formula 3:

wherein the separator is for power storage device which is interposed between a pair of electrodes and optionally holds an electrolyte-containing electrolytic solution, and the power storage device is selected from the group consisting of an electric double-layer capacitor, a lithium-ion capacitor and a lithium-ion secondary battery.

2. The separator according to claim 1, wherein the CSF value X and the tear index Y are within range further satisfying Formula 4:

$$Y \leq 0.1X + 40.$$ Formula 4:

3. The separator according to claim 2, wherein the CSF value X is within range further satisfying Formula 5:

$$0 \leq X \leq 50.$$ Formula 5:

4. The separator according to claim 1, wherein a thickness of the separator is 10 to 80 μm.

5. The separator according to claim 1, wherein a density of the separator is 0.25 to 0.70 g/cm³.

6. A separator,
wherein the separator is for power storage,
the separator has a multilayered structure, and
at least one separator layer is the separator according to claim 1.

7. A power storage device, comprising:
a pair of electrodes; and
the separator of claim 1 interposed between the pair of electrodes.

8. The power storage device according to claim 7, wherein the power storage device is selected from the group consisting of an electric double-layer capacitor, a lithium-ion capacitor and a lithium-ion secondary battery.

9. The power storage device according to claim 7, wherein the power storage device is an electric double-layer capacitor.

10. The power storage device according to claim 7, wherein the power storage device is a lithium-ion capacitor.

11. The power storage device according to claim 7, wherein the beatable regenerated cellulose fibers consists of:
from 20 to 80% of a first fiber having a CSF value of from 350 to 0 ml and
from 80 to 20% of a second fiber having a CSF value of from 1 to 500 ml in which the value is once lowered to 0 ml (lower limit) and then turns upward by further beating.

12. The separator according to claim 1, wherein the beatable regenerated cellulose fibers consists of:
from 20 to 80% of a first fiber having a CSF value of from 350 to 0 ml and
from 80 to 20% of a second fiber having a CSF value of from 1 to 500 ml in which the value is once lowered to 0 ml (lower limit) and then turns upward by further beating.

13. The power storage device according to claim 7, wherein the beatable regenerated cellulose fiber comprises at least two regenerated cellulose fibers having different degrees of beat.

14. The separator according to claim 1, wherein the beatable regenerated cellulose fiber comprises at least two regenerated cellulose fibers having different degrees of beat.

* * * * *